United States Patent
Bruce et al.

(10) Patent No.: US 8,151,126 B2
(45) Date of Patent: Apr. 3, 2012

(54) CONTROLLING POWER CONSUMPTION IN A DATA PROCESSING APPARATUS

(75) Inventors: Alistair Crone Bruce, Stockport (GB); Robin Hotchkiss, Sheffield (GB); Louisa Jayne McElwee, Glossop (GB)

(73) Assignee: ARM Limited, Cambridge (GB)

( * ) Notice: Subject to any disclaimer, the term of this patent is extended or adjusted under 35 U.S.C. 154(b) by 569 days.

(21) Appl. No.: 12/308,888

(22) PCT Filed: Jun. 29, 2006

(86) PCT No.: PCT/GB2006/002418
§ 371 (c)(1),
(2), (4) Date: Dec. 29, 2008

(87) PCT Pub. No.: WO2008/001024
PCT Pub. Date: Jan. 3, 2008

(65) Prior Publication Data
US 2009/0300382 A1    Dec. 3, 2009

(51) Int. Cl.
*G06F 1/26* (2006.01)
(52) U.S. Cl. .................. 713/310; 713/300; 713/320
(58) Field of Classification Search .................. 713/300, 713/310, 320
See application file for complete search history.

(56) References Cited

U.S. PATENT DOCUMENTS

| | | | |
|---|---|---|---|
| 6,609,209 B1 * | 8/2003 | Tiwari et al. | 713/322 |
| 6,782,486 B1 * | 8/2004 | Miranda et al. | 713/601 |
| 7,076,682 B2 * | 7/2006 | Jacobson | 713/600 |
| 7,346,723 B2 * | 3/2008 | Kim et al. | 710/305 |
| 7,571,335 B2 * | 8/2009 | Lee | 713/330 |
| 2003/0115491 A1 * | 6/2003 | Williams et al. | 713/300 |
| 2006/0082384 A1 | 4/2006 | Deogun et al. | |

OTHER PUBLICATIONS

International Preliminary Report on Patentability dated Jan. 6, 2009 for PCT/GB2006/002418.
International Search Report for PCT/GB2006/002418, mailed Jun. 4, 2007.
Written Opinion of the International Searching Authority for PCT/GB2006/002418, mailed Jun. 4, 2007.

\* cited by examiner

*Primary Examiner* — Kim Huynh
*Assistant Examiner* — Zahid Choudhury
(74) *Attorney, Agent, or Firm* — Nixon & Vanderhye, P.C.

(57) ABSTRACT

A data processing apparatus, bus logic and method are provided for controlling power consumption within a data processing apparatus. The data processing apparatus has a plurality of logic elements, at least one of the logic elements being an initiator logic element for initiating transfers, and at least one of the logic elements being a recipient logic element for receiving transfers. A communication path is provided between an initiator logic element and a recipient logic element to enable payload data the subject of a transfer to be passed from the initiator logic element to the recipient logic element. The communication path has at least one buffer circuit provided therein for propagating at least the payload data along the communication path. Further, a power control circuit is associated with the at least one buffer circuit, which is responsive to a control signal indicating whether the payload data on the communication path is valid. If the control signal indicates that the payload data is not valid, the power control circuit causes the associated at least one buffer circuit to enter a power saving state. The control signal is derived from at least one pre-existing signal associated with the transfer. This has been found to provide a particularly efficient and flexible technique for reducing leakage current in buffer circuits within the data processing apparatus.

18 Claims, 6 Drawing Sheets

CONTROLLING POWER CONSUMPTION IN A DATA PROCESSING APPARATUS

This application is the U.S. national phase of International Application No. PCT/GB2006/002418, filed 29 Jun. 2006, the entire contents of which is hereby incorporated by reference.

FIELD OF THE INVENTION

The present invention relates to techniques for controlling power consumption in a data processing apparatus.

BACKGROUND OF THE INVENTION

It is known to provide a data processing apparatus having logic elements which can communicate with each other over a communication path. Communication between the logic elements occurs via transfers which may be issued from one logic element (referred to herein as the initiator logic element) to another logic element (referred to herein as the recipient logic element) via the communication path. Often, the data processing apparatus will include multiple logic elements, and individual logic elements may be able to act as initiator logic elements for certain transfers and recipient logic elements for other transfers. In such a data processing apparatus, it is known to provide bus logic for providing the required communication paths between the various logic elements. One example of such bus logic is an interconnect circuit which provides multiple connections over which communication paths can be established between particular initiator logic elements and particular recipient logic elements.

As data processing apparatus increase in complexity, the number of logic elements provided within the data processing apparatus increase, and this increases the complexity of the bus logic. Typically bus logic may provide a larger number of paths for routing transfers between the various logic elements connected to the bus logic, and due to the general desire to keep such data processing apparatus as small as possible, the physical conductors laid out within the data processing apparatus to form these paths are becoming thinner and thinner. Typically the paths are formed from a metal such as copper, and in recent designs the individual conductive lines are getting so thin that resistance along those lines is becoming problematic. In particular, as the resistance and capacitance increases, the time taken for signals to propagate along the paths increases, reducing the performance of the data processing apparatus.

With the aim of seeking to combat this problem, it is known to provide buffer circuits within individual communication paths which are used to assist in speeding the propagation of the signals along the communication path. In particular, by the use of such buffer circuits, individual communication paths are broken down into smaller sections and the buffer circuits are used to amplify the signals as they are propagated from one section to another along the communication path. As a result, this improves the speed of propagation of signals along the communication path.

However, the introduction of such buffer circuits introduces a new problem, namely an increase in power consumption due to leakage currents within the buffer circuits, most notably substrate and gate leakage currents within the individual transistors forming the buffer circuits. In some implementations, power consumption is a very important issue, and in such implementations it is clearly desirable to seek to reduce the effects of such leakage current.

A number of known techniques have been developed for seeking to reduce such leakage current. For example, the article "Leakage-Aware Interconnect for On-Chip Network" by Yuh-Fang Tsai et al, Proceedings of the Design, Automation and Test in Europe Conference and Exhibition (Date 2005), pages 230 to 231, describes a number of leakage-aware interconnect designs where a mixture of high threshold voltage and nominal threshold voltage transistors are used to form the buffers, this giving rise to a buffer design that has less leakage current. To further reduce leakage current this article describes the use of a special sleep signal which in a standby mode pulls the input to a buffer circuit down to a low voltage level, which is found to further reduce leakage current.

The article "A New Threshold Voltage Assignment Scheme for Runtime Leakage Reduction in On-Chip Repeaters" by Saumil Shah et al, ICCD 2004, pages 138 to 143, also describes the use of mixed threshold voltage transistors to reduce leakage power consumption in buffers (referred to as "repeaters" in that article).

The article "Low-Leakage Repeaters for NoC Interconnects" by Arkadiy Morgenshtein et al, ISCAS 2005, describes several leakage reduction techniques for buffer circuits for Network-on-Chip (NoC) interconnects. Again, mixed threshold voltage designs are described where some of the transistors in the buffer have a low threshold voltage and some have a high threshold voltage. A design described employs header and footer sleep transistors associated with each buffer circuit (or alternates between header sleep transistors and footer sleep transistors from one buffer circuit to the next), which are driven by a clock signal to enable individual buffer circuits to be turned on or off, thereby reducing leakage current.

Whilst such an approach can produce power consumption savings in certain types of systems, for example systems where components are laid out in a regular and structured manner with the clock signal paths being laid out in close proximity to the payload data paths, the effectiveness of the approach is ultimately limited by the distribution of the clock signal, and by the granularity with which the clock signal can be gated for particular blocks of the system. For example, the buffer circuits do not actually retain state and accordingly do not need to be clocked. As a result, in many systems it is highly likely that a suitable clock signal will not be provided in physical proximity to the buffer circuits, and significant adaptation to the layout design would be required to facilitate the routing of a clock signal to those buffer circuits. In addition, if the clock signal were to be used to turn the buffer circuits on and off, then typically additional clock buffering would be required. Further, any individual clock signal will typically be used to control a particular block of components within the system and accordingly it would not be possible to use that clock signal to control only a particular communication path within the system. Accordingly, only a relatively coarse granularity of control can be achieved.

Accordingly, it would be desirable to provide an improved technique for reducing power consumption resulting from leakage current within buffer circuits provided within communication paths of a data processing apparatus.

SUMMARY OF THE INVENTION

Viewed from a first aspect, the present invention provides a data processing apparatus comprising: a plurality of logic elements, at least one of the logic elements being an initiator logic element for initiating transfers, and at least one of the logic elements being a recipient logic element for receiving transfers; a communication path coupling an initiator logic element with a recipient logic element, payload data the subject of a transfer being passed over the communication path from the initiator logic element to the recipient logic element; the communication path having at least one buffer circuit provided therein for propagating at least the payload data along the communication path; and a power control circuit associated with said at least one buffer circuit, responsive to a control signal indicative of whether the payload data on the communication path is valid, to cause the associated at least one buffer circuit to enter a power saving state when the control signal indicates that the payload data is not valid, the control signal being derived from at least one pre-existing signal associated with the transfer.

In accordance with the present invention, a power control circuit is provided which receives a control signal that is derived from at least one pre-existing signal associated with the transfer. The use of a pre-existing signal avoids the need to generate a separate dedicated control signal for the power control circuit, and thereby avoids the additional complexities that would be involved in generating and routing such a dedicated signal. Further, since the pre-existing signal used is one that is associated with the transfer, it can be used specifically to achieve power control within the communication path over which the payload data of that transfer is passed. In particular, in accordance with the present invention, if the control signal indicates that the payload data is not valid, then the power control circuit causes the at least one buffer circuit in that communication path to enter a power saving state.

Hence, by deriving the control signal from a pre-existing signal that is associated with the transfer, fine granularity of control can be achieved, since the value of the control signal can be specified independently for each communication path. Further, since the pre-existing signal used is associated with the transfer, it will typically be routed in close physical proximity to the actual payload data of that transfer, and accordingly the routing complexities are reduced when compared with using a system-wide signal such as a clock signal. Another disadvantage of using a clock signal, which is alleviated by the present invention, is that additional buffering of the clock signal would be required if the clock signal were to be used to control power, and this would partially offset any power savings due to the resultant leakage power loss from that additional clock buffering logic. As a result, the approach of the present invention is a much more flexible and efficient approach, since it can be used in a wide variety of different designs of data processing apparatus.

In one embodiment, the communication path has multiple buffer circuits arranged in series along the communication path, and the control signal is passed along a path having a buffer element provided therein in association with each buffer circuit, whereby the time at which each buffer circuit enters or exits the power saving state is staggered with respect to other of said buffer circuits. Such an approach is particularly useful when exiting the power saving state, as it inherently smoothes out the power-on surge that might otherwise be observed if each of the buffer circuits exited the power saving state at exactly the same time.

The buffer elements used to buffer the control signal may be permanently powered. However, alternatively, each such buffer element may be provided within the associated buffer circuit, and as a result may be subjected to the power saving state when the control signal indicates that the payload data is not valid. Such an approach will give rise to a further reduction in leakage current, since the leakage current that might otherwise be observed within the buffer elements is reduced when the power saving state is entered. When the power saving state is exited, the staggering of the turn on times of each of the buffer circuits is further spread out, due to the delay in not only propagating the control signal along the path through each buffer element, but also due to the time taken to turn each buffer element on when exiting the power saving state. Hence, depending on a balance to be struck between overall reduction in leakage current and speed of turn on when exiting the power saving state, it can be decided whether to place the control signal buffer elements within the buffer circuit subjected to the power saving state by the power control circuit, or whether instead to not subject those buffer elements to such a power saving state but instead leave them on permanently.

The power control circuit can be arranged in a variety of ways. However, in one embodiment, a separate power control circuit is provided for each buffer circuit. In a typical implementation, the communication path used to carry the payload data may be many bits wide, for example a 32-bit communication path, and in such instances an associated buffer circuit will typically comprise a separate physical buffer for each bit across the width of the communication path, each such buffer typically comprising multiple transistors. As a result, the logic within the power control circuit needs to be relatively large, such that when the associated buffer circuit is powered up, the power control circuit can provide the necessary power to all of the individual buffers within the buffer circuit. As a result, in such implementations it may be preferable to provide a separate power control circuit for each buffer circuit rather than sharing a particular power control circuit amongst multiple buffer circuits.

In one embodiment, each buffer element is provided within the associated power control circuit. In such embodiments, a cell can be defined that includes the power control circuit for a particular buffer circuit and an associated buffer element used to buffer the control signal. When the control signal is in fact provided directly by a particular pre-existing signal associated with the transfer, such an approach provides a great deal of flexibility, since at the layout stage of the design, it can be decided whether to merely provide a standard buffer element used to buffer the pre-existing signal as it is routed along the communication path, or whether instead to use one of the above-mentioned cells which includes that buffer element, but additionally includes the power control circuit necessary to facilitate the use of a power saving state for the associated buffer circuit. If the use of the power saving state is desired for a particular buffer circuit, then the new cell will be used, and if for a particular buffer circuit power saving is not required, then the standard buffer element can instead be used.

The control signal may take a variety of forms. It may for example be derived from multiple pre-existing signals associated with the transfer. However, in one embodiment, the control signal is a pre-existing valid signal associated with the transfer and asserted by the initiator logic element when the payload data is valid. In one particular embodiment, once the valid signal is asserted, the initiator logic element is operable to keep the valid signal asserted until receipt of a signal from the recipient logic element causes a handshake to take place. Accordingly, the use of the valid signal as the control signal in such embodiments is particularly beneficial, since when the valid signal is asserted, the various buffer circuits within the communication path can be brought out of the power saving state reliably in a staggered manner, safe in the knowledge that they will not have to be put back into the power saving state until after the transfer has occurred.

The signal received from the recipient logic element can take a variety of forms. In one embodiment, the signal from the recipient logic element is a ready signal that is asserted by the recipient logic element when that recipient logic element is available to receive the payload data, the recipient logic element being arranged such that once the ready signal is asserted it will not be de-asserted until the payload data has been received, the valid signal as received by the power control circuit being qualified by the ready signal so that the power saving state is only exited when the valid signal indicates that the payload data is valid and the ready signal indicates that the recipient logic element is available to receive the payload data. Hence, if the ready signal can be arranged to continue to be asserted until the payload data has been received, then qualifying the valid signal with such a ready signal reduces the amount of time that the power saving state is exited for.

One bus protocol that uses valid and ready signals is the AXI (Advanced eXtensible Interface) protocol developed by ARM Limited, Cambridge, United Kingdom, which requires that an initiator logic element issues a valid signal when it wishes to initiate a transfer, and that this valid signal is held stable until the completion of a handshake that takes place when a ready signal is asserted by the recipient logic element. Whilst there is a requirement for the valid signal to be held stable until completion of the handshake (a valid signal conforming to this requirement sometimes being referred to as a "sticky" valid signal), the ready signal is not constrained in this way. Instead, in the general case, the ready signal may be asserted and de-asserted in any clock cycle depending on the internal state of the recipient logic element. Indeed, some recipient logic elements may even wait for a valid signal to be asserted before they issue a ready signal. Accordingly, the above described process for reducing the amount of time that the power saving state is exited from may not be able to be used in all situations. However, in some situations, it may be possible to place a constraint on a particular recipient logic element such that once it has asserted the ready signal it will continue to assert the ready signal until it receives the payload data (a ready signal having this property also being referred to herein as a "sticky" ready signal). Indeed, in U.S. patent application Ser. No. 10/862,812, owned by the applicant of the present application (the contents of which are incorporated herein by reference), a storage element is described which can temporarily store the transfer data of a transfer, and that storage element is arranged such that it does use a sticky ready signal. Accordingly, in situations where the recipient logic element is provided by such a storage element, then the qualifying of the valid signal with such a ready signal would give rise to further power savings. In particular, in such a situation, the power saving state would only need to be exited for a single clock cycle per transfer.

The power control circuit can take a variety of forms. However, in one embodiment the power control circuit comprises one or more header transistors located between the at least one buffer circuit and a power supply to the at least one buffer circuit. Such header transistors will typically be larger than the transistors used within the buffer circuit, so as to ensure that those header transistors can provide the power required to turn on the various transistors within the buffer circuit when that buffer circuit is not in the power saving state. Further, such header transistors typically have a relatively high threshold voltage to reduce leakage current from those header transistors.

In one embodiment, the data processing apparatus has a pipelined architecture and the communication path is provided within a pipeline stage traversable by the payload data in a single clock cycle, the control signal being propagated one cycle ahead of its associated payload data, whereby said at least one buffer circuit enters or exits the power saving state ahead of the time the payload data reaches that buffer circuit. Accordingly, in situations where latency is a key concern, such an approach can be used to reduce the latency in exiting the power saving state by ensuring that each buffer circuit along the communication path exits the power saving state ahead of the time the payload data reaches that buffer circuit.

In one embodiment, a single power saving state is provided, namely a state where the power control circuit causes the power supply to the buffer circuit to be removed, thereby causing the buffer circuit nodes to drift to ground potential. In this state, there is minimum substrate and gate current leakage. However, in alternative embodiments, more than one possible power saving state may be provided. In particular, in one embodiment, when the control signal indicates that the payload data is not valid, the power control circuit is operable to select based on at least one further control signal one of a plurality of available power saving states for the associated at least one buffer circuit to enter. Such an approach hence requires an additional control signal to be routed to each power control circuit, but does provide extra flexibility with regard to choice of power saving state.

In one embodiment, the power control circuit is further operable to receive an override signal which when set causes the power saving state to be disabled. Accordingly, by such an approach, the operation of the power control circuit can effectively be overridden by the override signal as and when required. In modern data processing apparatus, Intelligent Energy Management (IEM) techniques are being adopted, which enable voltage supplies within the apparatus and/or frequency of the clock signal to be altered with the aim of achieving better energy consumption. In such embodiments, the IEM circuitry could be used to generate the override signal in certain situations where it was felt appropriate not to use the power saving state.

In one embodiment, the power control circuit comprises a plurality of transistors arranged in parallel, when the control signal indicates that the payload data is not valid, all of said transistors being turned off to disconnect the buffer circuit from a power supply to thereby cause the buffer circuit to enter a power down power saving state, unless the at least one further control signal is set in which event a subset of the transistors are turned on to thereby cause the buffer circuit to enter a retention power saving state. Hence, as an alternative to a full power down mode of operation, a retention mode of operation can be used where the voltage on the buffer circuit nodes may droop, but can be retained above a particular logic threshold value. In some situations, this may result in less energy wastage and/or power supply spikes if the duration of the power saving state is relatively short. Hence, in some such embodiments, it may be appropriate to use the retention power saving state for a relatively short period of time, and thereafter proceed to the fill power down state if the power saving state has not in the interim been exited. As with the override signal, IEM control logic could be used to generate the further control signal used to select between the full power down and the retention state.

The initiator logic element and the recipient logic element can take a variety of forms. Indeed, for some transfers the initiator logic element may be a master device whilst the recipient logic element is a slave device, whilst for other transfers the initiator logic element may be a slave device whilst the recipient logic element is a master device. Further, either one or both of the initiator logic elements may be storage elements used to temporarily store at least the payload data during its transfer between a master device and a slave device. In particular, in situations where the path between a master device and a slave device is of such a length that it cannot be traversed in a single clock cycle, storage elements can be placed within that path in order to separate the path into a number of communication paths which can be traversed in a single clock cycle.

The communication path between the initiator logic element and the recipient logic element can take a variety of forms. For example it may be a dedicated point-to-point link between a particular initiator logic element and a particular recipient logic element. However, in one embodiment, the communication path is provided within interconnect logic used to provide a plurality of paths for interconnecting the plurality of logic elements.

Viewed from a second aspect, the present invention provides bus logic operable to interconnect a plurality of logic elements to enable data transfers to occur, at least one of the logic elements being an initiator logic element for initiating transfers, and at least one of the logic elements being a recipient logic element for receiving transfers, the bus logic comprising: a communication path coupling an initiator logic element with a recipient logic element, payload data the subject of a transfer being passed over the communication path from the initiator logic element to the recipient logic element; at least one buffer circuit within the communication path for propagating at least the payload data along the communication path; and a power control circuit associated with said at least one buffer circuit, responsive to a control signal indicative of whether the payload data on the communication path is valid, to cause the associated at least one buffer circuit to enter a power saving state when the control signal indicates that the payload data is not valid, the control signal being derived from at least one pre-existing signal associated with the transfer.

Viewed from a third aspect, the present invention provides a method of controlling power consumption within a data processing apparatus having a plurality of logic elements, at least one of the logic elements being an initiator logic element for initiating transfers, and at least one of the logic elements being a recipient logic element for receiving transfers, the method comprising the steps of: passing payload data the subject of a transfer over a communication path from an initiator logic element to a recipient logic element; using at least one buffer circuit provided within the communication path to propagate at least the payload data along the communication path; and responsive to a control signal indicative of whether the payload data on the communication path is valid, causing the associated at least one buffer circuit to enter a power saving state when the control signal indicates that the payload data is not valid, the control signal being derived from at least one pre-existing signal associated with the transfer.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
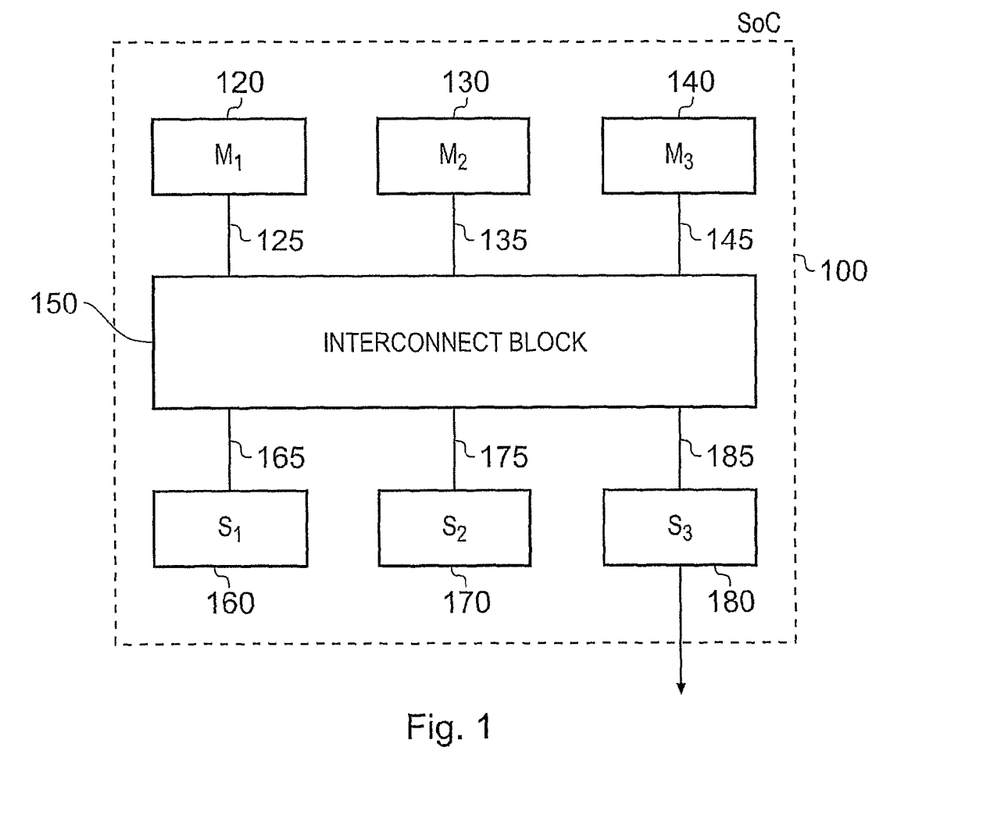
FIG. 1 is a block diagram illustrating the use of a bus interconnect block within a data processing apparatus.

For the purposes of describing an embodiment of the present invention, a communication path coupling an initiator logic element with a recipient logic element is considered to be provided within an interconnect block of a data processing apparatus used to interconnect multiple master and slave devices. FIG. 1 illustrates a particular example of such a data processing apparatus.

FIG. 1 illustrates a data processing apparatus in the form of a System-on-Chip (SoC), which may be used within a device such as a personal organiser, a mobile phone, a television set-top box, etc. The SoC design 100 has a plurality of logic elements 120, 130, 140, 160, 170, 180 that are interconnected by an arrangement of buses. The actual interconnection of these buses is specified within an interconnect block or circuit 150. The interconnect block 150 includes a matrix of paths which provides for the interconnection of multiple bus master devices and bus slave devices within the SoC 100. Hence, each master device 120, 130, 140 may be connected to corresponding buses 125, 135, 145, respectively, whilst each slave device 160, 170, 180 may also be connected to corresponding buses 165, 175, 185, respectively, with the interconnect block 150 defining how these various buses are interconnected.

The buses interconnecting the various elements will typically operate in accordance with a specified bus protocol, and hence for example may operate in accordance with the "Advanced Microcontroller Bus Architecture" (AMBA) specification developed by ARM Limited, Cambridge, United Kingdom.

Accordingly, it will be appreciated that the interconnect block 150 will describe a complex arrangement of interconnections between various master and slave devices. This complex arrangement may include a number of unidirectional channels of information. Within one or more of these channels there may be connections which are shared between multiple paths, and for which the interconnect block needs to perform arbitration in order to ensure that at any point in time only one transfer's data is being routed over such a shared connection.

In order to seek to meet a requirement for a chosen characteristic of the bus interconnect block, such as an improvement in a timing characteristic, one or more storage elements (also referred to herein as register slices) may be inserted within the interconnect block. Given a channel of information, a register slice can be used to insert a register between a source and destination on each of the information signals within the channel.

Within a system such as that described with reference to FIG. 1, the interconnect logic can be seen to couple a number of master and slave devices to enable transactions to be performed. Each transaction consists of an address transfer from a master device to a slave device (via any intervening register slices) and one or more data transfers between that master device and that slave device (again via any intervening register slices). For a write transaction, these data transfers will pass from the master device to the slave device (in some implementations there will additionally be a write response transfer from the slave device to the master device), whilst for a read transaction these data transfers will pass from the slave device to the master device.

The interconnect logic provides a plurality of connection paths for coupling the various master devices and slave devices, and the way in which the various transfers are routed via those connection paths will be dependent on the bus protocol employed within the interconnect logic. One known type of bus protocol is the non-split transaction protocol, such as is employed within a data processing apparatus having an AHB bus designed in accordance with the AHB bus protocol developed by ARM Limited, Cambridge, United Kingdom. In accordance with such a non-split transaction protocol, there is a fixed timing relationship between the address transfer of a transaction and the subsequent one or more data transfers of that transaction. In particular, the data transfer starts in the cycle following that in which the address is transferred.

As interconnect logic increases in complexity, due to the need to support the interconnection of a larger number of master and slave devices, then another type of bus protocol has been developed known as a split transaction protocol. In accordance with such a split transaction protocol, the plurality of connection paths within the interconnect logic provide at least one address channel for carrying address transfers and at least one data channel for carrying data transfers. An example of such a split transaction protocol is the AXI (Advanced eXtensible Interface) protocol developed by ARM Limited, Cambridge, United Kingdom. The AXI protocol provides a number of channels over which information and data can be transferred, these channels comprising a read address channel for carrying address transfers of read transactions, a write address channel for carrying address transfers of write transactions, a write data channel for carrying data transfers of write transactions, a read data channel for carrying data transfers of read transactions, and a write response channel for returning transaction status information to the master device at the end of a write transaction, such transaction status information indicating for example whether the transaction completed successfully, or whether an error occurred, etc. Use of such a split transaction protocol can increase the performance of a system compared with a similar system using a non-split transaction protocol.

Whilst embodiments of the present invention are applicable to various different bus protocols, for the purposes of describing a particular embodiment of the present invention, it will be assumed that the interconnect logic of FIG. 1 uses the above-mentioned AXI protocol.

As the interconnect logic increases in complexity due to the increase in the number of master and slave devices to be supported, and given the general desire to keep the apparatus as small as possible, the actual physical wires providing the various connection paths within the interconnect logic are becoming thinner and thinner. This has resulted in an increase in the resistance and capacitance observed along those paths, which has the effect of slowing down the speed of transfer of signals along those paths. As described earlier, buffer circuits can be introduced into those paths with the aim of amplifying the signals at various points along the path and as a result increasing the speed of transfer of the signals. However, these buffer circuits can give rise to undesirable leakage current which adversely affects the power consumption of the apparatus. In accordance with embodiments of the present invention, power control circuitry is provided in association with each such buffer circuit with the aim of seeking to reduce leakage current.

Figure 2:
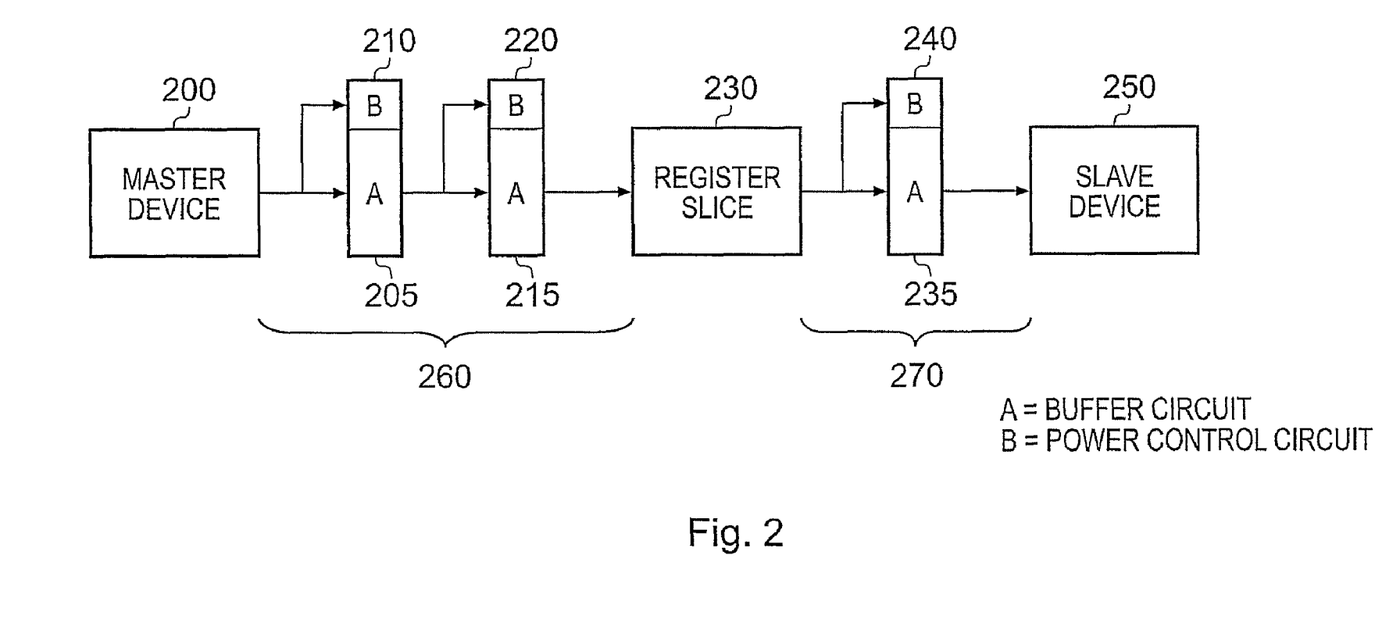
FIG. 2 is a block diagram illustrating the provision of buffer circuits within communication paths provided by the interconnect block of FIG. 1 in accordance with one embodiment of the present invention.

FIG. 2 is a diagram schematically illustrating a connection path from a master device 200 to a slave device 250 via an intervening register slice 230. The connection path can hence be seen to consist of two communication paths, a first communication path 260 being between the master device 200 and the register slice 230, and a second communication path 270 being between the register slice 230 and the slave device 250. In the example shown in FIG. 2, the first communication path 260 has two buffer circuits 205, 215 provided therein, and the second communication path 270 has a single buffer circuit 235 provided therein. In accordance with embodiments of the present invention each buffer circuit 205, 215, 235 has a power control circuit 210, 220, 240 associated therewith, which receive as an input a control signal derived from at least one pre-existing signal associated with the transfer occurring over the communication path.

In the example illustrated in FIG. 2, the transfer is assumed to be passing from the master device 200 to the slave device 250, and accordingly may be a write address transfer over the write address channel, a data transfer over the write data channel, or a read address transfer over the read address channel. Each channel has a pair of handshake signals referred to as ready and valid signals that are used to coordinate the transfer of data. The valid signal is asserted when the sender has driven valid payload data onto the channel payload signals. This payload data will typically consist of the actual data being transferred (e.g. an address on an address channel, or write/read data on a write/read channel, respectively) along with certain control information, for example used in identifying the type of transfer. The ready signal is asserted when the receiver is ready to receive payload data. A handshake occurs when the valid and ready signals are asserted in the same clock cycle. The AXI protocol requires that once the valid signal has been asserted, it cannot be de-asserted until a handshake has occurred.

In accordance with such an embodiment of the present invention, the control signal used as an input to the power control circuits 210, 220, 240 is the valid signal asserted by the sender. Accordingly, the power control circuits 210, 220 in FIG. 2 receive the valid signal output by the master device 200, which when asserted will indicate that valid payload data is being output by the master device 200. Similarly, the power control circuit 240 in FIG. 2 will receive a valid signal issued by the register slice 230, which will be asserted when the register slice outputs valid payload data.

Figure 3:
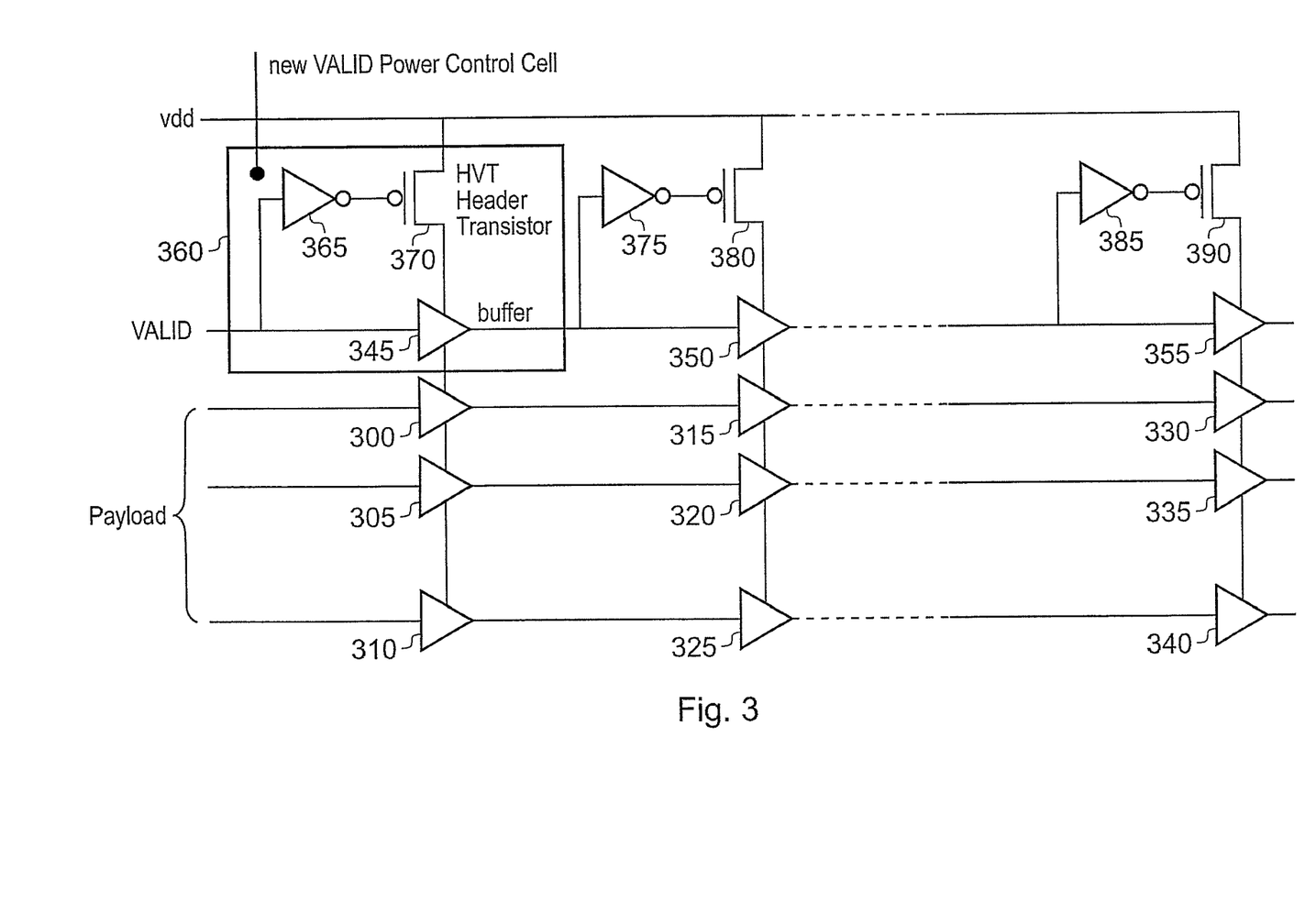
FIG. 3 is a diagram illustrating the provision of power control circuits in association with buffer circuits of a communication path in accordance with one embodiment of the present invention.

FIG. 3 is a diagram schematically illustrating the buffer circuits and associated power control circuits that may be used within a communication path in accordance with one embodiment of the present invention. In FIG. 3, the individual bit lines forming the communication path are shown, and the payload portion of the communication path will typically consist of multiple bit lines, three of which are shown in FIG. 3. Each buffer circuit will contain a separate buffer for each bit line, and accordingly a first buffer circuit consists of the buffers 345, 300, 305, 310, a second buffer circuit consists of the buffers 350, 315, 320, 325, and a further buffer circuit consists of the buffers 355, 330, 335, 340. In this embodiment, it will be noted that the valid signal is also propagated along the communication path via each buffer circuit, through use of the buffers 345, 350, 355.

In accordance with this embodiment of the present invention, a power control cell is provided in association with each buffer circuit, which in this embodiment includes logic that enables the associated buffer circuit to be placed into a power saving state, including the buffer element used to buffer the valid signal. Accordingly, considering the first buffer circuit formed by buffers 345, 300, 305, 310, a power control cell 360 is provided, which incorporates the buffer element 345, and an inverter 365 and header transistor 370 for performing the required power control function. The header transistor 370 is a high threshold voltage and high drive (i.e. large) header transistor, which when turned on will provide sufficient power to drive all of the transistors in the individual buffer elements 345, 300, 305, 310 of the associated buffer circuit.

It will be appreciated that when the valid signal is at a low voltage level (indicating that the payload data is not valid), then the inverter 365 will cause a logic one level to be supplied to the header transistor 370 which will turn that header transistor off, thereby de-coupling the buffer elements 345, 300, 305, 310 of the buffer circuit from their supply voltage VDD. As a result, the nodes of the individual buffer elements drift to ground potential with no further power being dissipated, and in this state there is minimum substrate and gate leakage.

When the valid signal is asserted at a logic one level, indicating that the payload data is valid, then the inverter 365 will cause a logic zero level to be provided to the header transistor 370, causing the header transistor to turn on. In this state, the header transistor 370 provides a low resistance connection to VDD and the individual buffer elements 345, 300, 305, 310 of the buffer circuit then behave normally, to cause the valid signal and associated payload data to be propagated over the communication path.

As discussed earlier, the header transistor 370 has to be large enough to supply all the power for the buffers without saturating. The size of the header transistor is in the embodiment of FIG. 3 kept down by using a separate header transistor for each separate buffer circuit along the communication path of the channel. Accordingly, a second power control cell is formed by inverter 375 and header transistor 380, along with the associated buffer element 350, and a further power control cell is formed by the inverter 385 and header transistor 390, along with the associated buffer element 355.

The use of the separate power control circuitry for each buffer circuit has the further benefit of reducing the power surge that would otherwise occur when the header transistors are switched on. In particular, as will be seen from FIG. 3, when the valid signal is asserted, the header transistor 380 will not be turned on until the header transistor 370 has turned on and the associated buffer element 345 has then driven the valid signal from its output. Likewise, the header transistor 390 will not turn on until the header transistor associated with the preceding buffer circuit has turned on and the valid signal has been propagated from the buffer element of that buffer circuit. This delay hence causes the power to be applied in sequence along the channel, spreading the power surge over the channel delay.

It should be noted that whilst in FIG. 3 the various buffer elements forming a particular buffer circuit are shown in columns, such buffer circuits are not themselves a layout cell but rather are a grouping of individual buffer elements connected to a single "virtual" VDD supply provided by the associated power control circuit. In reality, the individual buffers forming any particular buffer circuit will be dispersed within the interconnect as dictated by the exigencies of the layout. Hence, as an example, the buffer elements 345, 300, 305, 310 forming the first buffer circuit may not be located in a distinct group within the layout of the interconnect but may in fact be more dispersed within the interconnect. Additionally, whilst for ease of illustration FIG. 3 shows an example implementation having the same number of buffers in every bit line, some bit lines may have fewer or more buffers as a result of placement and timing decisions.

Figure 4:
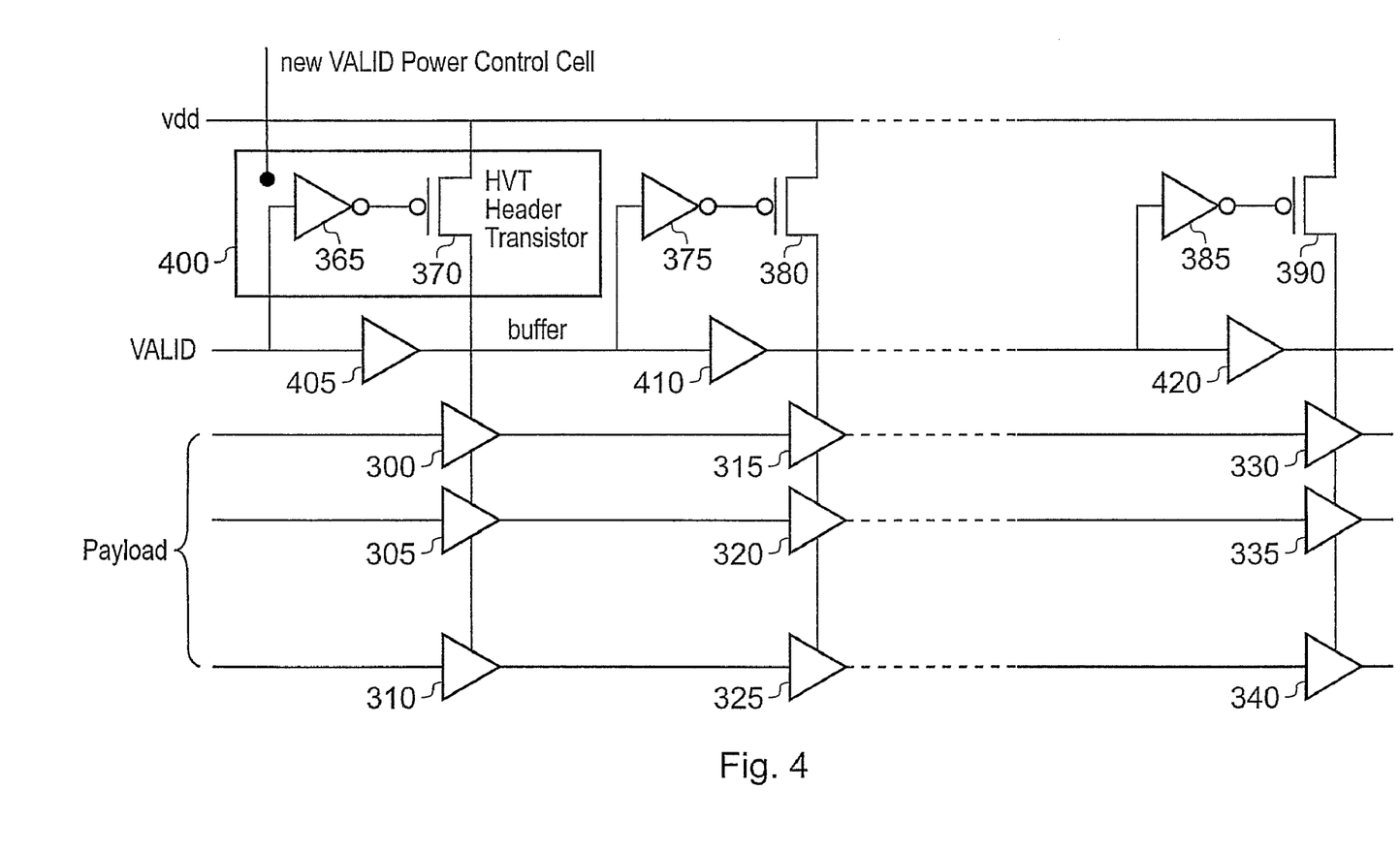
FIG. 4 is a diagram illustrating the provision of power control circuits in association with buffer circuits of a communication path in accordance with an alternative embodiment of the present invention.

FIG. 4 illustrates an alternative embodiment of the present invention where the buffer elements used to buffer the valid signal are not subjected to the power saving state. Each power control cell in this embodiment hence just comprises the inverter and associated header transistor. Accordingly, a first power control cell 400 consists of the inverter 365 and header transistor 370. Similarly, a second power control cell is formed by the inverter 375 and associated header transistor 380, and a further power control cell is formed by the inverter 385 and header transistor 390. The valid signal is received by these power control cells in the same way as discussed earlier with reference to the power control cells of FIG. 3, but in this instance the buffer circuit associated with the power control cell comprises only the buffer elements forming the payload part of the communication path. In contrast, the buffer elements 405, 410, 420 used to buffer the valid signal are permanently powered, and are not subjected to the power saving state. Whilst this will result in those buffer elements producing leakage current even when no valid payload data exists, there will be a reduction in the time taken to exit the power saving state when the valid signal is asserted. For example, the header transistor 380 no longer needs to wait for header transistor 370 to turn on, but instead is merely delayed with respect to the turning on of the header transistor 370 by the inherent delay in propagation of the valid signal along the path through buffer 405. Accordingly, the power surge is still spread out since the header transistor in each separate power control cell will turn on at slightly different times, but overall time taken to exit the power saving state across the communication path will be less, thereby reducing latency.

Figure 5:
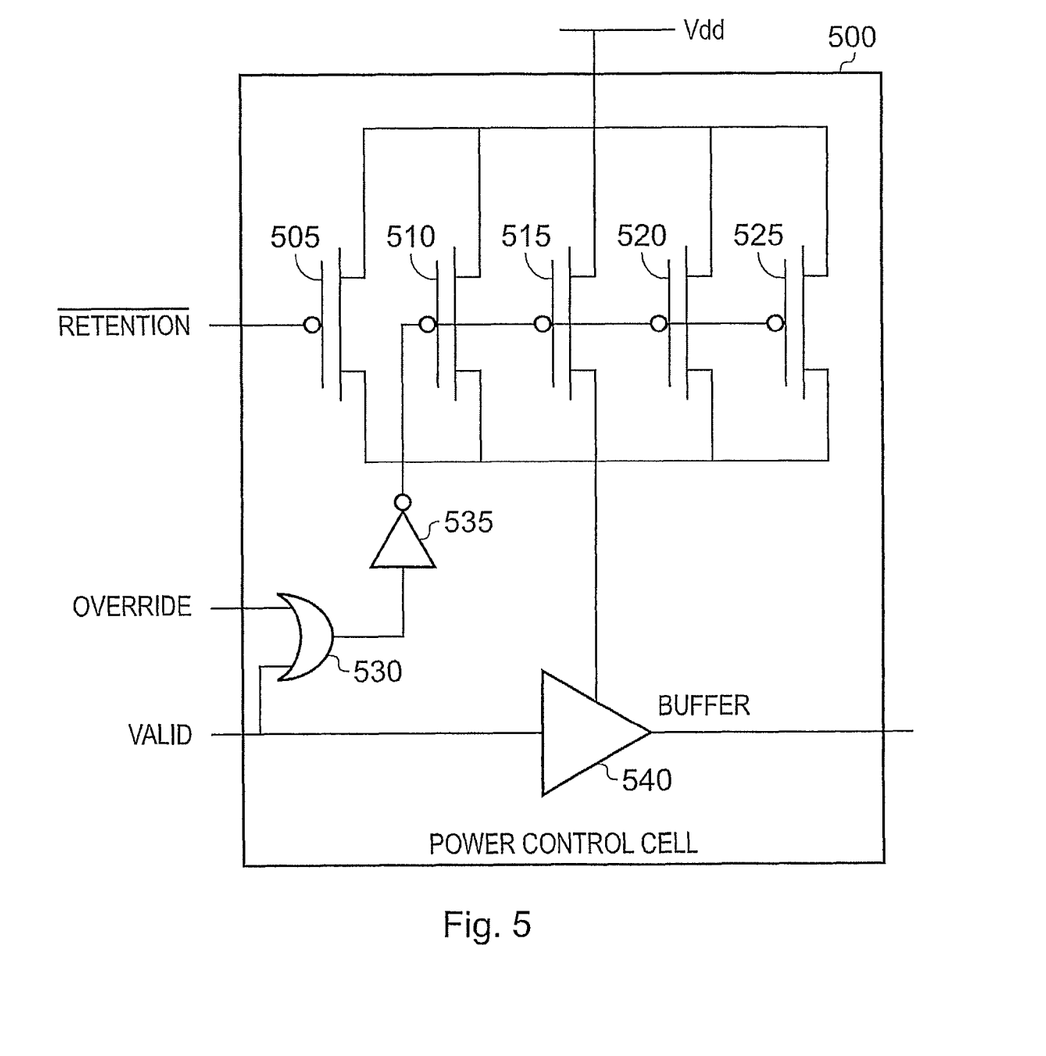
FIG. 5 is a diagram schematically illustrating an alternative embodiment for the power control circuit of FIG. 3 in accordance with one embodiment of the present invention.

FIG. 5 illustrates an alternative embodiment of power control cell that may be used instead of the power control cell illustrated in FIG. 3. In this embodiment, each power control cell 500 consists of a plurality of header transistors 505, 510, 515, 520, 525 arranged in parallel. In addition to the valid signal, this power control cell 500 receives two further signals, namely an override signal and a retention state signal. The group of transistors 510, 515, 520, 525 acts like the header transistor illustrated in FIG. 3, in that when the valid signal is asserted high, that signal will be propagated via OR gate 530 to the inverter 535, to cause a logic zero value to be provided to each of the transistors 510, 515, 520, 525, thereby turning those transistors on and causing the buffers in the associated buffer circuit, including the buffer element 540 associated with the valid signal, to operate normally. However, when the valid signal is de-asserted, then the inverter 535 will cause a logic one value to be provided to the transistors 510, 515, 520, 525, thereby essentially disconnecting the associated buffer circuit from its supply voltage VDD. As a result, each of the internal nodes within each buffer element will drift to ground potential, thereby reducing leakage current in the power saving state.

However, in accordance with the FIG. 5 embodiment, a retention signal can also be input, which when at a logic zero level (indicating that a retention state is not required), will cause the transistor 505 to be turned off (by virtue of the retention signal being inverted prior to input to transistor 505). However, if the retention state is set to a logic one value, indicating that a retention state is desired, then this will cause the transistor 505 to be turned on. Accordingly, even if the valid signal is low, this means that the buffer elements of the associated buffer circuit are still coupled to VDD through the single transistor 505. The single transistor 505 will not produce enough power to allow all of the buffer elements to operate normally, and as a result the voltage at the internal nodes within each buffer element will droop. However, rather than drifting to ground potential, the current passing through the transistor 505 will be sufficient to hold these internal nodes above a particular logic threshold value. As a result, when the valid signal subsequently goes high, and the power saving state is exited, there is likely to be less energy wastage and less power consumed than if the retention state were not used. However, in the retention state there will still be some leakage current observed, but less than in the fully on state.

In one particular embodiment, it is envisaged that the retention signal will be driven by some intelligent energy management (IEM) logic provided within the data processing apparatus to perform overall energy management functions. In one particular embodiment it is envisaged that the IEM control logic may be arranged to set the retention state for a short period whilst the valid signal is not set, such that the initial power saving state is a retention state. Once that short period has expired, then the retention state may be de-asserted, so that the full power down state is then entered, assuming that in the interim the valid signal has not been asserted to indicate that the power saving state should be exited.

As shown in FIG. 5, the power control circuit also receives an override signal, which when set causes the power saving state to be disabled by causing the transistors 510, 515, 520, 525 to be turned on. Accordingly, by such an approach, the operation of the power control circuit can effectively be overridden by the override signal as and when required. In one embodiment, the above mentioned IEM logic could be used to generate the override signal in certain situations where it was felt appropriate not to use the power saving state.

It will be appreciated that the exact number of transistors provided in parallel within the power control cell can be varied, and indeed there is no requirement for the retention signal to only be routed to a single transistor. It will also be appreciated that in another variant the buffer 540 could be omitted from the power control cell 500, such that the resultant power control cell could be used as an alternative to the power control cell 400 illustrated in FIG. 4.

Further, as an alternative to the use of the retention transistor 505, the header transistor, or group of header transistors as shown in FIG. 5, can be biased so as not to switch off completely when the valid signal is low, as a result of which the voltage at the internal nodes will droop but will be held above a particular threshold value.

Figure 6:
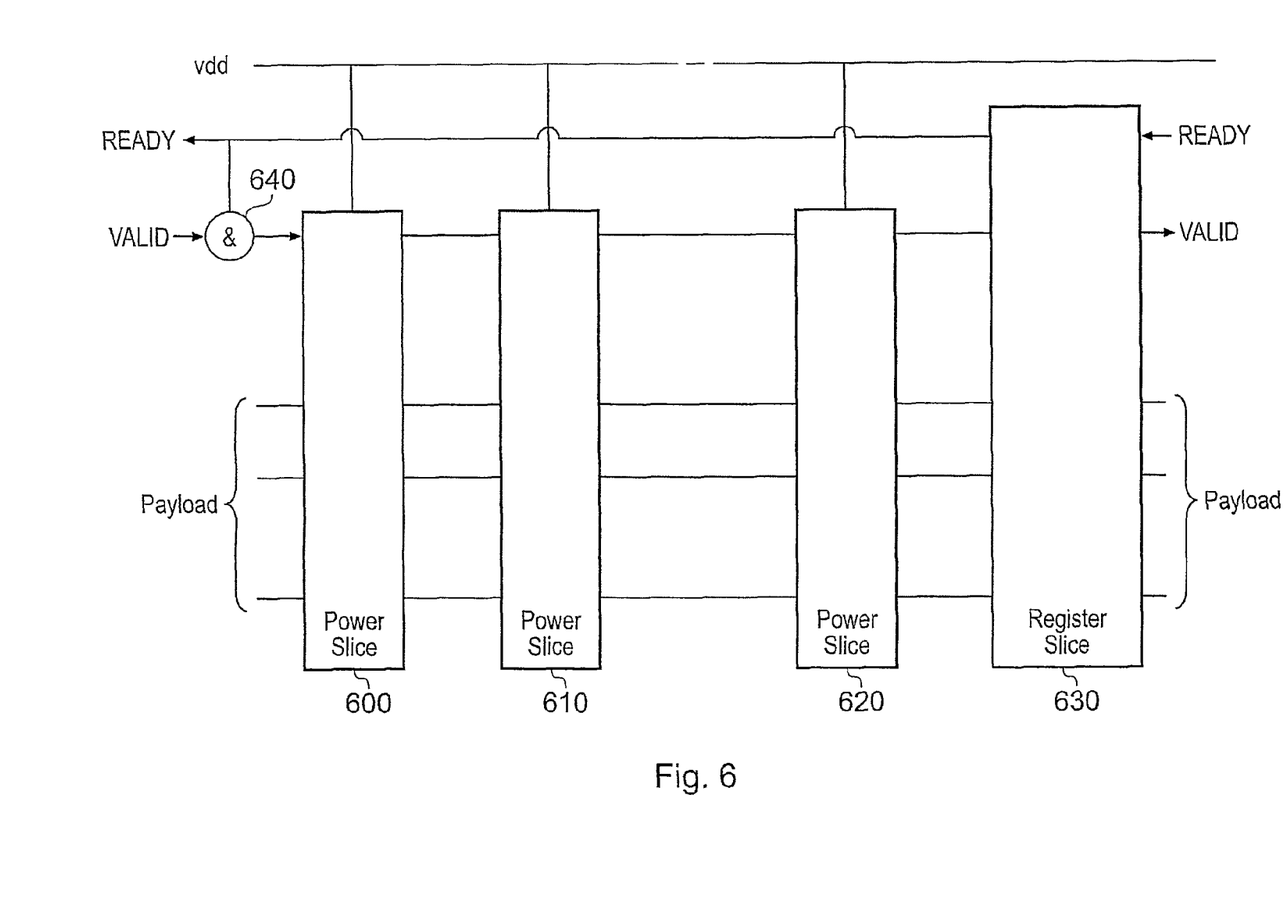
FIG. 6 is a block diagram schematically illustrating how the valid signal may in one embodiment of the present invention be qualified by a ready signal issued by a storage element forming a recipient logic unit within a communication path.

FIG. 6 illustrates a further embodiment of the present invention, where the recipient logic element is a register slice that is able to assert a "sticky" ready signal. Accordingly, when the register slice asserts a ready signal indicating that it is available to store transfer data, it will continue to assert that ready signal until the transfer data has been received. As a result, this ready signal can be used to qualify the valid signal input to each power control circuit associated with each buffer circuit in a communication path.

In FIG. 6, a plurality of power slices 600, 610, 620 are shown within a communication path, each power slice comprising a power control circuit and its associated buffer circuit. The register slice 630 is arranged to receive the signals output from the final power slice 620. The logic 640 is arranged to logically AND the ready signal issued by the register slice 630 with the valid signal issued by the initiator logic element of the communication path. As a result, an asserted valid signal will only be passed on to the power slices 600, 610, 620 when the ready signal has been asserted. Thus, the power saving state will only be exited when both the valid signal and the ready signal are asserted, thereby reducing the time that the buffer circuits spend in the active state. In particular, the various buffer circuits within the communication path are only powered up for one cycle per transfer. A register slice such as that described in FIG. 6 is discussed in more detail in U.S. patent application Ser. No. 10/862,812, owned by the applicant of the present application.

It will be appreciated that in alternative embodiments, other recipient logic elements other than register slices may be able to assert a sticky ready signal, and accordingly could be used instead of the register slice 630 in FIG. 6.

In the above described embodiments of the present invention, the power control circuits only use header transistors, rather than both header and footer transistors, as it has been found that this gives nearly as much power savings as would occur using both header and footer transistors. The internal nodes of the buffer elements of each buffer circuit drift to ground potential when the associated header transistor(s) is turned off, thus reducing leakage current within each of those buffer circuits. A further reduction in power consumption is achieved when the valid signal is also gated by a sticky ready signal, such that the buffer circuits only exit the power saving state for one cycle per transfer.

From the above described embodiments of the present invention, it will be appreciated that a flexible approach for reducing leakage current within buffer circuits provided in communication paths of a data processing apparatus is provided. In particular, a control signal derived from at least one pre-existing signal associated with a transfer is used to determine whether to cause a buffer circuit in the associated communication path to enter a power saving state or not. By using a pre-existing signal associated with the transfer, the control signal can be set on a transfer-by-transfer basis, and this hence provides a fine level of granularity of control over the power saving operation. In addition, the use of such a control signal reduces wiring complexity, since typically the pre-existing signal associated with the transfer will already be routed in close proximity to the payload data paths. Further, there is no need to rely on special dedicated power control signals.

In particular embodiments of the present invention, no changes are required to the register transfer language (RTL) design process, since at the layout stage it can be decided whether to include a power control cell or whether alternatively merely to include a standard buffer element to buffer the valid signal passed over the particular communication path.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus comprising:
   a plurality of logic elements, at least one of the logic elements being an initiator logic element for initiating transfers, and at least one of the logic elements being a recipient logic element for receiving transfers;
   a communication path coupling an initiator logic element with a recipient logic element, payload data the subject of a transfer being passed over the communication path from the initiator logic element to the recipient logic element;
   the communication path having at least one buffer circuit provided therein for propagating at least the payload data along the communication path;
   a power supply for providing power to said at least one buffer circuit; and a power control circuit, associated with said at least one buffer circuit and responsive to a control signal indicative of whether the payload data on the communication path is valid, configured to cause said at least one buffer circuit to enter a power saving state by decoupling said at least one buffer circuit from said power supply when the control signal indicates that the payload data is not valid, the control signal being derived from at least one pre-existing signal associated with the transfer.

2. A data processing apparatus as claimed in claim 1, wherein the communication path has multiple buffer circuits arranged in series along the communication path, and the control signal is passed along a path having a buffer element provided therein in association with each buffer circuit, whereby the time at which each buffer circuit enters or exits the power saving state is staggered with respect to other of said buffer circuits.

3. A data processing apparatus as claimed in claim 2, wherein each said buffer element is provided within the associated buffer circuit.

4. A data processing apparatus as claimed in claim 1, wherein a separate said power control circuit is provided for each buffer circuit.

5. A data processing apparatus as claimed in claim 4, wherein each said buffer element is provided within the associated power control circuit.

6. A data processing apparatus as claimed in claim 1, wherein the control signal is a pre-existing valid signal associated with the transfer and asserted by the initiator logic element when the payload data is valid.

7. A data processing apparatus as claimed in claim 6, wherein once the valid signal is asserted, the initiator logic element is operable to keep the valid signal asserted until receipt of a signal from the recipient logic element causes a handshake to take place.

8. A data processing apparatus as claimed in claim 7, wherein the signal from the recipient logic element is a ready signal that is asserted by the recipient logic element when that recipient logic element is available to receive the payload data, the recipient logic element being arranged such that once the ready signal is asserted it will not be de-asserted until the payload data has been received, the valid signal as received by the power control circuit being qualified by the ready signal so that the power saving state is only exited when the valid signal indicates that the payload data is valid and the ready signal indicates that the recipient logic element is available to receive the payload data.

9. A data processing apparatus as claimed in claim 1, wherein the power control circuit comprises one or more header transistors located between the at least one buffer circuit and a power supply to the at least one buffer circuit.

10. A data processing apparatus as claimed in claim 1, wherein the data processing apparatus has a pipelined architecture and the communication path is provided within a pipeline stage traversable by the payload data in a single clock cycle, the control signal being propagated one cycle ahead of its associated payload data, whereby said at least one buffer circuit enters or exits the power saving state ahead of the time the payload data reaches that buffer circuit.

11. A data processing apparatus as claimed in claim 1, wherein when the control signal indicates that the payload data is not valid, the power control circuit is operable to select based on at least one further control signal one of a plurality of available power saving states for the associated at least one buffer circuit to enter.

12. A data processing apparatus as claimed in claim 11, wherein the power control circuit is further operable to receive an override signal which when set causes the power saving state to be disabled.

13. A data processing apparatus as claimed in claim 11, wherein the power control circuit comprises a plurality of transistors arranged in parallel, when the control signal indicates that the payload data is not valid, all of said transistors being turned off to disconnect the buffer circuit from a power supply to thereby cause the buffer circuit to enter a power down power saving state, unless the at least one further control signal is set in which event a subset of the transistors are turned on to thereby cause the buffer circuit to enter a retention power saving state.

14. A data processing apparatus as claimed in claim 1, wherein the initiator logic element is a master device, a slave device or a storage element used to temporarily store at least the payload data during its transfer between a master device and a slave device.

15. A data processing apparatus as claimed in claim 1, wherein the recipient logic element is a master device, a slave device or a storage element used to temporarily store at least the payload data during its transfer between a master device and a slave device.

16. A data processing apparatus as claimed in claim 1, wherein the communication path is provided within interconnect logic used to provide a plurality of paths for interconnecting the plurality of logic elements.

17. Bus system for interconnecting interconnect a plurality of logic elements to enable data transfers to occur, at least one of the logic elements being an initiator logic element for initiating transfers, and at least one of the logic elements being a recipient logic element for receiving transfers, the bus system comprising:
 a communication path coupling an initiator logic element with a recipient logic element, payload data the subject of a transfer being passed over the communication path from the initiator logic element to the recipient logic element;
 at least one buffer circuit within the communication path for propagating at least the payload data along the communication path;
 a power supply for providing power to said at least one buffer circuit; and
 a power control circuit, associated with said at least one buffer circuit and responsive to a control signal indicative of whether the payload data on the communication path is valid, configured to cause said at least one buffer circuit to enter a power saving state by decoupling said at least one buffer circuit from said power supply when the control signal indicates that the payload data is not valid, the control signal being derived from at least one pre-existing signal associated with the transfer.

18. A method of controlling power consumption within a data processing apparatus having a plurality of logic elements, at least one of the logic elements being an initiator logic element for initiating transfers, and at least one of the logic elements being a recipient logic element for receiving transfers, the method comprising the steps of:
 passing payload data the subject of a transfer over a communication path from an initiator logic element to a recipient logic element;
 using at least one buffer circuit provided within the communication path to propagate at least the payload data along the communication path, said data processing apparatus including a power supply for supplying power to said at least one buffer circuit; and causing, in response to a control signal indicative of whether the payload data on the communication path is valid, said at least one buffer circuit to enter a power saving state by decoupling said at least one buffer circuit from said power supply when the control signal indicates that the payload data is not valid, the control signal being derived from at least one pre-existing signal associated with the transfer.

* * * * *